United States Patent
Böhm et al.

(10) Patent No.: US 6,803,101 B1
(45) Date of Patent: Oct. 12, 2004

(54) UNORIENTED SURFACE-PROTECTION FILM OF POLYPROPYLENE BLOCK COPOLYMERS

(75) Inventors: Nicolai Böhm, Hamburg (DE); Ralf Hirsch, Quickborn (DE); Jobst-Waldemar Klemp, Schenefeld (DE); Robert Meyer, Norderstedt (DE); Bernhard Müssig, Seevetal (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/980,597

(22) PCT Filed: May 18, 2000

(86) PCT No.: PCT/EP00/04505

§ 371 (c)(1),
(2), (4) Date: Mar. 6, 2002

(87) PCT Pub. No.: WO00/71633

PCT Pub. Date: Nov. 30, 2000

(30) Foreign Application Priority Data

May 22, 1999 (DE) .......................... 199 23 780

(51) Int. Cl.⁷ .............................................. B32B 27/32
(52) U.S. Cl. ............................... 428/354; 428/355 RA; 428/355 EN; 428/515; 428/516; 428/520; 428/522; 156/241
(58) Field of Search ................................ 428/515, 516, 428/520, 522, 355 RA, 355 EN, 354; 156/247

(56) References Cited

U.S. PATENT DOCUMENTS

| | | | |
|---|---|---|---|
| 4,751,121 A | 6/1988 | Kühnel et al. | ................. 428/40 |
| 5,925,456 A | 7/1999 | Malek | ......................... 428/332 |
| 5,998,018 A | 12/1999 | Murakami et al. | .......... 428/343 |
| 6,030,702 A | * 2/2000 | Matsui et al. | ................ 428/343 |

FOREIGN PATENT DOCUMENTS

| | | | | |
|---|---|---|---|---|
| EP | 0 215 189 | | 3/1987 | .............. C09J/7/02 |
| EP | 0 768 354 | * | 4/1997 | |
| WO | WO 96/25292 | * | 8/1996 | |
| WO | WO 097/38059 | | 10/1997 | .............. C09J/7/02 |

OTHER PUBLICATIONS

Patent Abstracts of Japan, English translation of referenced JP 08–143838, Jun. 4, 1996 Sheet for Protecting Coated Film, Applicant: Nitto Denko Corp, Kansai Paint Co. Ltd.

* cited by examiner

*Primary Examiner*—D. Lawrence Tarazano
(74) *Attorney, Agent, or Firm*—Norris McLaughlin & Marcus PA

(57) ABSTRACT

A self-adhesive protective film having a backing layer and an adhesive layer, characterized in that
 the backing layer is an undrawn film,
 the backing layer comprises at least one polypropylene block copolymer and
 the amount of polypropylene block copolymer makes up from 10 to 95% (w/w) of the protective film.

20 Claims, No Drawings

UNORIENTED SURFACE-PROTECTION FILM OF POLYPROPYLENE BLOCK COPOLYMERS

The invention relates to a weathering-stable self-adhesive protective film with high adhesion for protecting surfaces such as glass, ceramic, stainless steel, polycarbonate glass of acrylic glass, especially painted surfaces. The protective films of the invention are particularly suitable for protecting the fresh finish of vehicles such as automobiles and for protecting freshly painted vehicle parts against soiling and damage during assembly, transit and storage.

For surface protection on unpainted areas there are numerous products. Painted areas have to date been covered little with self-adhesive protective films, and virtually not at all in the fresh state without being fully cured. When conventional protective films are used on fresh paint, numerous deficiencies arise, such as adhesive residues, instances of discoloration, severe peel increase (increase in bond strength following storage in the bonded state), tearing on removal, shrinking on storage, weak initial adhesion or low stretchability (especially on uneven bond substrates).

After prolonged periods, particularly after weathering, such effects become intensified. Application on vehicles (automobiles) and vehicle parts (bumpers for example) where the surface is to be protected during assembly or transit is therefore a challenging problem. The preservation and protection of motor vehicles during transit from manufacturer to dealer has long been common practice.

For the preservation of automobiles it is known to apply paraffin waxes in a thickness of from 5 to 20 µm. However, it has been found that, especially on horizontal areas of the vehicles, a thin and usually non-uniform layer of this kind does not afford adequate protection against external influences, such as the corrosive effect of bird droppings, for example.

A considerable disadvantage of paraffin wax sealing is the need to remove the preservative using a steam jet, surfactants or solvents. Environmentally sound recovery and disposal of the residues are a cause of great complexity in terms of apparatus and of very high costs.

Reversibly adhering self-adhesive films for protecting the automobile during transit have likewise been known for some time but have so far been used only to a small extent. In many cases the films in question are permanently adhering protective and decorative films, such as an antistonechip film, for example. These self-adhesive films remain permanently on the vehicle after they have been mounted.

Adhesive tapes or protective films with self-adhesive compositions based on natural rubber possess relatively good initial adhesion and may be removed again without residue. Even on short-term exposure to UV radiation, however, these compositions are not stable to aging. Following extreme weathering exposure over a prolonged period (three to six months), this leads to severe greasy residues or hardened paint-like residues on the painted metal.

Polyacrylate compositions, on the other hand, are very UV-stable. If uncrosslinked polyacrylate compositions are subjected to storage under alternating climatic conditions, their compatibility with paint surfaces is good only in some cases. Compatibility means that there are no defects visible on the surface after the adhesive tape has been removed. On the other hand, however, these compositions exhibit severe peel increase, so that when the film is difficult to peel off they leave significant residues of the adhesive composition on the substrate If these compositions are strongly crosslinked chemically or by radiation, they may in some cases be removed without residue but on the other hand cause permanent deformations on the paint surface and, furthermore, in some cases exhibit inadequate adhesion when bonded to curved painted areas.

JP 02 199 184 discloses a radiation-crosslinkable pressure-sensitive adhesive in which for protective application on paint films it is necessary to formulate a low glass transition temperature in order to prevent permanent deformations of the paint film. Here, problems arise owing to inadequate bond strength of the self-adhesive film to the motor vehicles during application and transit.

The same applies to acrylates as described in U.S. Pat. No. 5,612,136. Moreover, the method of irradiation disclosed therein damages the film, thereby reducing its weathering stability if irradiation is continued to the point where the residual monomers have abated completely as a result of polymerization. At relatively low irradiation doses, the residual monomer content is so high that these monomers migrate into the vehicle finish and, as a result, cause it to swell. A further disadvantage is the migration of photoinitiators into the paint, where they lower its UV stability.

Self-adhesive compositions based on polyisobutylene (polyisobutylene homopolymer or butyl rubber) exhibit easy removal in the bonding test in which they are applied to painted metal panels and then undergo storage under alternating climatic conditions. The initial adhesion, however, is low, so that critical edges have to be fastened using a more strongly adhering adhesive tape (a so-called edge securing tape). Under the influence of moisture, in particular the bond strength of the film is frequently reduced to such an extent that the film detaches from the protected vehicles in the course of transit, with the consequence that the protective effect is no longer there. Moreover, these adhesives are soft (not very cohesive) and therefore produce residues of composition when the film is removed, especially in the edge region after UV aging. Furthermore, this self-adhesive composition is not compatible with the rubber seals (sealing profiles) customary in automobile construction or with the plasticizers they contain; when the protective film is removed from window profiles, residues of the adhesive coating remain on the rubber. Adhesive tapes and films of this kind are described in EP 0 519 278, JP 95-325285 and U.S. Pat. No. 5,601,917.

EP 0 592 913 describes a surface protection film for the transit of automobiles which consists of an EVAc copolymer having a vinyl acetate content of 33%. With (his protective film, the application of an adhesive layer does not take place. Admittedly, a film of this kind has a simple structure, but exhibits distinct disadvantages in use, Owing to the high crystalline fraction the bond strength is very low; this deficiency is said to be eliminated by heating on application. Additionally these films, unless provided with a release cover (silicone paper, for example), lead to blocking on storage, as taught by EP 0 768 356. The films described exhibit severe paint deformation and are very difficult to remove following use. A reason for the latter phenomenon is that the EVAc described in the examples, with 33% (w/w) vinyl acetate has sealing properties (it is commonly employed for sealing applications). From 40% (w/w) vinyl acetate on, the crystalline fraction is so low that this defect does not occur; therefore, the protective film of the invention also preferably comprises an adhesive having a high vinyl acetate content.

The adhesive sheet set out in DE 195 32 220, comprising EVAc adhesive, is significantly superior in adhesion to the products described. With the exception of one-component PU systems, there is no effect on the finishes that are to be protected, During removal after use, however, this adhesive sheet has a high bond strength, and so cannot be removed without tearing. This increase in bond strength when the adhesive assembly is stored, which the skilled worker calls peel increase, is caused by interactions of the adhesive, especially polar forces, with the paint. On the other hand, polar comonomers such as acrylate or vinyl acetate give rise to the desired high initial adhesion.

Significantly more stable to UV than polyisobutylenes are adhesives comprising hydrogenated styrene-diene block copolymers, whose use is described in the utility model DE 296 04 473. A substantial disadvantage of such block copolymers is their thermally reversible crosslinking by way of the styrene domains. If an adhesive sheet produced from them is removed in the summer from a vehicle which has become hot in the sun, the adhesive largely remains adhering to the paint, since the cohesion of the adhesive compositions is lower than the adhesion to the paint. Heating always leads to the shrinkage of the protective sheet; the adhesive, soft in the heat, smears onto the metal from the retreating edges of the adhesive sheet.

EP 0 661 364 describes a surface protection film having an adhesive composition which is said to display good initial adhesion. Bond strengths on steel of up to 1 kg/25 mm are described, corresponding approximately to AFERA bond strengths to steel of up to 4.0 N/cm and resulting in particularly high adhesion following storage of the assembly. The films described are not stable to light, since no measures are taken such as the addition of HALS light stabilizers or light-reflecting pigments for achieving the light stabilization necessary for this application. The use of protective film on the outside of vehicles imposes particularly extreme challenges in respect of light stability, especially in the UV region, so that despite good initial adhesion such protective films are entirely unsuitable for this application. In the case of applications on vehicles, the stretchability of the film plays an important part owing to curved surfaces; however, the cited invention specifically emphasizes suitability for planar areas (plates and boards) and therefore also does not attempt to limit the force at 10% elongation in order to achieve sufficient stretchability.

WO 96137568 describes the use of polyhexene and, respectively, polyoctene for a non-polar pressure-sensitive adhesive. Because of the low cohesion, the polymers described in the examples do in fact exhibit little peel increase, but these polymers, owing to the low molecular weight of commercial polymers of this kind, likewise lead to residues, which attempts are made to avoid by adding other polymers, referred to therein as "Cold flow restricting agents". For practical purposes, nevertheless, the specified adhesives are still of inadequate cohesion (softness), which leads after weathering to residues, especially if the adhesive tape shrinks under the affect of heat.

It is accordingly an object of the invention to provide an adhesive film which possesses a sufficiently high initial bond strength so that when bonded under tension (application of the adhesion film to curved areas) no detachment occurs and which nevertheless is easy to remove following prolonged storage (up to one year under weathering). At the same time, no shrinkage should occur, and the protective film should be detachable without tearing and without sealing. Additionally, no release covering should be needed for storage.

This object is achieved by means of a protective film as specified in the main claim. The subclaims relate to advantageous developments of the subject matter of the invention. Furthermore, the invention also embraces particular fields of use of the protective film of the invention, and a process for producing it.

The inventive subject matter relates accordingly to a self-adhesive protective film (also called adhesive surface protection tape) which comprises a layer of an undrawn backing layer (also called backing or backing film) and an adhesive layer.

In advantageous embodiments of the invention, further layers such as adhesion promoter or release layers may be present additionally or as part of the abovementioned layers.

As the backing layer of the adhesive, a thermoplastic polyolefin film is used which is unoriented and comprises at least one polypropylene block copolymer. The polypropylene block copolymer content of the protective film is from 10 to 95% (w/w).

The UV transmittance of the protective film in the range from 290 to 360 nm is preferably below 1%, more preferably below 0.1%. Additionally, the bond strength to steel is preferably between 0.2 and 3.8 N/cm, in particular between 0.7 and 1.7 N/cm Films of this kind may be manufactured on film blowing lines or, preferably, casting lines (T-die technology), with the film not being monoaxially or biaxially oriented by drawing (orientation) with stretching rolls or stretching frames. In the blowing of such a film, the orientation should be minimized by way of take-off speed, blow-up ratio and temperature profile.

The polypropylene block copolymers used in accordance With the invention (and also called impact resistant polypropylene) are described in the literature in Encycl. Polym. Sci. Technol. 13, 479ff (1988) and in Ullmann's Encyclopedia of Industrial Chemistry A21, 529ff (1992). Examples of trade names are Propathene GSF 113 (ICI), 411 GA 05 (Amoco), PMA 6100 (Montell), Stamylan P (DSM), BD 801 F (Borealis), Daplen FFC1012 (PC), Novolen 2309 L.

Block copolymers of this kind differ from one another substantially in their melt index (=MFI=MFR) and in the comonomer content. The melt index influences the strength of the film and the fluidity of the melt in opposing directions. For the preparation of the protective film of the invention, a melt index of from 0.8 to 15 g/l 0 min (ISO 1133 (A/4) at 230° C. and 2.16 kg) is advantageous in order to achieve the requirements of toughness and tensile strength on the one hand and processibility (production speed and uniformity of thickness in the case of coextruded films) on the other. The preferred range lies between 4 and 10 g/10 min. With this product, coextrusion is an appropriate means of introducing the adhesion promoter layer during the production of the film.

Where backing film and adhesive are connected to one another by coextrusion, the selection of the melt index of the polypropylene block copolymer and of the other thermoplastic ingredients of the film formulation is important. The amount of comonomer in polypropylene block copolymers determines the softness, tensile impact strength and heat stability of the protective film produced from them. The protective film of the invention preferably comprises a polypropylene block copolymer containing from 3 to 15% (w/w) ethylene as comonomer. The tensile impact strength to DIN 53448 should be at least 1,000 mJ/mm$^2$ in both the longitudinal (machine direction, MD) and transverse (cross-direction, CD) directions.

As further ingredients it is possible, for example, to use polyethylene (such as HDPE, LDPE, MDPE, LLDPE, VLL-DPLE for example), copolymers of ethylene or propylene with polar comonomers, polypropylene homopolymers or polypropylene random copolymers to fine-tune the properties (mechanical, thermal or other properties such as gloss, adhesion of the adhesive, extrusion characteristics, etc.). It is particularly advantageous to combine two or more polypropylenes, especially of different softness and different melt indices, such as soft block copolymer with PP homopolymer or a hard block copolymer grade, for example, since toughness, heat stability and flow characteristics can be adapted more effectively to the requirements than when a block copolymer alone is used. For sufficient heat stability, the fraction of propylene in a film layer should be at least 65% (w/w). With a multi-ply structure of the film layer, this is the layer which is responsible for the strength and which therefore contains the highest polypropylene fraction (and in general also has the greatest thickness), and not any adhesion promoter layer.

Preferred thicknesses for the backing films are from 20 to 80 μm (including the adhesion promoter layer where appropriate). During the application of the protective film, the softness of the backing film plays a part in connection with the deformability; the force at 10% elongation should not exceed 25 N/15 mm, preferably 16 N/15 mm, in either the machine or cross directions (tensile test to DIN 53455-7-5). This is also one of the reasons why the backing films should be unoriented. Stretching (also called drawing) raises the force at 10% elongation so greatly that the film is no longer assured of conformability (for comparison, typical values are 100 N/15 mm for monoaxially oriented PP block copolymer and 180 N/15 mm for biaxially oriented homopolymer).

Furthermore, the strength in the transverse direction with respect to orientation or in the third dimension (perpendicular to the film surface) is so greatly reduced that when the protective film of the invention is removed there is a danger of tears or delamination in the third dimension (also called splitting). This applies in particular with adhesives possessing particularly good adhesion, such as, for example, the preferred ethylene-vinyl acetate copolymer adhesives. In this respect as well the use of polypropylene block copolymer has proven to be particularly suitable, so that when an effectively adhering adhesive is used the protective film does not tear on removal. In the course of a test of surface protection tapes following UV weathering it was found that, in the case of backing film made from standard polypropylene (polypropylene homopolymer), standard polyethylene (HDPE) or a 1:1 mixture thereof, embrittlement occurred very quickly; in the case of LDPE or polypropylene random copolymer (with 5% ethylene) the conditions are more favorable, while the best results are achieved with polypropylene block copolymer containing from 3 to 15% (w/w) ethylene. The advantages of using polypropylene block copolymer for the backing film therefore stand out particularly well in the case of removal after weathering, which is highly relevant to practical use. With this invention's preferred combination of polypropylene block copolymer for the backing film and strongly adhering ethylene-vinyl acetate copolymer for the adhesive, it is possible to achieve the important properties of high adhesion and yet good redetachability of the protective film in an impressive way without contradiction.

A further advantage was found to be the resistance of the protective film of the invention to shrinkage under hot conditions. This is important in order that no greasy traces of the adhesive are formed at the edges of the surface covered with the protective film. It is also of advantage for the passage of the film web through an oven for the purpose of drying the adhesive. Protective films comprising polyethylene as their main ingredient lack sufficient heat stability, even though the conformability (stretchability) is particularly advantageous for automotive application.

The use of polyethylene or of polypropylene random copolymers as the main film constituent of surface protection tapes is customary on account of the fact that the conformability (see above under softness/deformability) is favorable. Additionally, the toughness is better than with polypropylene (homopolyrner), which has good heat resistance but is less brittle. The same applies to protective films for covering automobiles. Protective films of this kind have the disadvantage, however, that the heat stability is only moderate, The use of polypropylene block copolymers as the main film ingredient of the surface protection tapes of the invention uniquely resolves the conflict between adequate softness on the one hand and heat stability on the other. The same applies to the contradictory requirement for high toughness combined with heat stability.

The protective films of the invention preferably have a shrinkage in machine and cross directions of less than 3%, with particular preference of less than 1%. The shrinkage is measured in a forced air oven at 120° C., by placing the sample on a heavily talced paper board for 10 minutes.

A further surprising fact is that, as a substantial film ingredient, polypropylene block copolymer has a favorable effect on the unwinding characteristics. Protective films of this kind are generally used with a width of more than 1 m. Under these conditions the unwinding force becomes relatively high, especially in the presence of strongly adhering adhesives, With the protective film of the invention it is therefore generally possible to dispense with a release coating for greater ease if unwinding. Following storage of the rolls of the surface protection tape (protective film) with strongly adhering ethylene-vinyl acetate copolymer adhesive, unwinding is fairly difficult if use is made neither of a release nor of a polypropylene block copolymer as a substantial film ingredient. Accordingly, this combination is particularly favorable. Unwinding difficulties lead not only to overexertion on the part of the persons using the film but also to an irreversible distortion of the protective film at those points grasped by the person (or a gripper device) in order to unwind the roll.

As adhesive compositions it is possible to use elastomers such as, for example, EPDM or EPM rubber, polyisobutylene, butyl rubber, EVM (ethylene-vinyl acetate copolymer), hydrogenated block copolymers of dienes (for example by hydrogenation of SBR, cSBR, BAN, NBR, SBS, SIS or IR; such polymers are known, for example, as SEPS and SEBS) or acrylic copolymers such as ACM. Since the protective films of the invention are to be stable with respect to aging and weathering, unstable unsaturated elastomers such as natural rubber, SIS, SBS, SBR or NBR are less suitable The light stabilizers specified for this film may also be used for the adhesive composition. This addition enhances the aging stability of the adhesive composition, especially with UV exposure above 100 kLy (kilolangleys), and is indispensable for applications involving ethylene-vinyl acetate copolymer adhesives with outdoor weathering for up to 6 months. In the case of adhesives comprising polyisobutylene hornopolymers or butyl rubbers, an addition of this kind is mandatory if adhesive residues are to be avoided under very severe UV exposure.

It may be advantageous to crosslink the adhesive composition. This raises the heat stability (for example, under alternating climatic conditions): peel increase on rough or nonpolar substrates such as synthetic rubber window seals is reduced as a result. In addition and in particular, crosslinking enhances the shear strength. This is particularly important in the context of protective film application, since it resists shrinkage of the protective film in the application. For crosslinking, the customary crosslinking agents are suitable. Preference is given to the technique of radiation crosslinking, particularly with UV and electron beams. In the case of UV radiation, the adhesive composition is irradiated from the adhesive composition side. The radiation dose may be reduced through the use of photoinitiators or the addition of crosslinking promoters such as esters of allyl alcohol, of methacrylic acid or of acrylic acid to the adhesive composition.

Copolymers of ethylene or vinyl acetate, especially ethylene-vinyl acetate copolymers having a VAc fraction of at least 40% (w/w), proved to be particularly suitable. They guarantee a high bond strength even in critical cases (adhesive-repelling paints or strongly curved bond areas) and possess high weathering stability even without the addition of light stabilizers to the adhesive. Preference is given to a VAc fraction of from 55 to 70% (w/w). The combination of unoriented polypropylene block copolymer as backing film and ethylene-vinyl acetate copolymer as adhesive is also favorable on account of the fact that the one material exhibits little shrinkage and the other is very highly resistant (shear strength) to shrinkage in the bonded state. The shear strength is so good that it is generally possible to dispense with crosslinking.

In order to optimize the properties, especially the bonding characteristics to specific paints, the self-adhesive composition (adhesive) employed may be blended with one or more additives such as tackifiers (resins), plasticizers, fillers, pigments, UV absorbers, light stabilizers, aging inhibitors, crosslinking agents or crosslinking promoters.

Examples of tackifiers are hydrocarbon resins (formed, for example, from unsaturated $C_5$ or $C_7$ monomers), terpene phenolic resins, terpene resins made from raw materials such as α- or β-pinene, aromatic resins such as coumarone-indene resins or resins of styrene or α-methylstyrene, such as rosin and its derivatives such as disproportionated, dimerized or esterified resins, it being possible to use glycols, glycerol or pentaerythritol, and also others as listed in Ullmann's Enzyklopädie der technischen Chemie, volume 12, pages 525 to 555 (4th edition), Weinheim. Particularly suitable are resins stable to aging, without olefinic double bonds, such as hydrogenated resins, for example.

Examples of suitable fillers and pigments are carbon black, titanium dioxide, calcium carbonate, zinc carbonate, zinc oxide, silicates or silica.

Suitable UV absorbers, light stabilizers and aging inhibitors for the adhesive compositions are the same as those listed later on below for the stabilization of the film.

Examples of suitable plasticizers for additional use are aliphatic, cycloaliphatic and aromatic mineral oils, diesters or polyesters of phthalic acid, trimellitic acid or adipic acid, liquid rubbers (for example nitrile rubbers or polyisoprene rubbers), liquid polymers of butene and/or isobutene, acrylates, polyvinyl ethers, liquid resins and soft resins based on the raw materials for tackifier resins, lanolin and other waxes, or liquid silicones.

Examples of crosslinking agents include phenolic resins or halogenated phenolic resins, melamine resins and formaldehyde resins. Examples of suitable crosslinking promoters include maleimides, allyl esters such as triallyl cyanurate, and polyfunctional esters of acrylic and methacrylic acid.

For certain paint systems it is advantageous to add constituents of the paints to the adhesive in order to reduce the migration of paint constituents (for example fatty acid esters of glycerol, silicones or other plasticizers) from the paint into the adhesive composition. Paint constituents of this kind are described in more detail in EP 0 763 584 and U.S. Pat. No. 5,612,135.

Furthermore, it is advantageous for physical recycling and heat energy recovery if the adhesive, and particularly the entire protective film, is halogen-free To improve the adhesion between film and adhesive it is advantageous to apply an adhesion promoter layer. The particularly preferred solution is a backing film consisting of a base layer comprising polypropylene block copolymer and an adhesion promoter layer, The latter preferably comprises polymers and/or components of base layer and/or adhesive. With particular preference the adhesion promoter comprises at least one polymer containing at least one o-olefin and a polar comonomer. Examples thereof include ionomer, ethylene-vinyl acetate copolymer, ethylene-(meth)acrylic acid copolymer or maleic anhydride-modified polyolefins.

The adhesion promoter may be applied by coextrusion with the base film or by coextrusion with base film and adhesive, or by coating onto the base film.

One advantageous embodiment comprises applying the adhesion promoter simultaneously with the extrusion of the film, so that the resulting coextrusion film need only be coated with the adhesive. Technically the best solution for the protective film of the invention is the simultaneous coextrusion of film and adhesive (including an adhesion promoter layer where appropriate).

In order to give the backing film weathering stability, it is advisable to add light stabilizers. There function with regard to the use of the protective film consists primarily in preventing the embrittlement of the backing film, in order to avoid problems when the adhesive surface protection tape is removed again. In the case of a multi-ply backing film, the protection or stabilization relates in particular to the relatively thick base layer. Light stabilizers of this kind are described in Gaechter and Müller, Taschenbuch der Kunststoff-Additive, Munich 1979, in Kirk-Othmer (3rd) 23, 615–627, in Encycl. Polym. Sci. Technol. 14, 125–148 and in Ullmann (4th) 8, 21, 15, 529, 676. In particular, HALS light stabilizers such as, for example, dimethyl succinate polymer with 4-hydroxy-2,2,6,6-tetramethyl-1-piperidineethanol (CAS No 65447-77-0), bis(2,2,6,6-tetramethyl4-piperidinyl) sebacate (CAS No. 52829-07-9) or poly[[6-[(1,1,3,3-tetramethylbutyl)amino]-1,3,5-triazine-2,4-diyll][[(2,2,6,6-tetramethyl-4-piperidyl)imino] hexamethylene[(2,2,6,6-tetramethyl4-piperi-dyl)imino]] (CAS No. 70624-18-9) are suitable for the protective film of the invention. The amount of light stabilizer should be at least 0.15%, preferably at least 0.30% (w/w), based on the backing film.

The use of antioxidants for the film (for example, Irganox 1010 or trisnonylphenyl phosphite) is advantageous but not absolutely necessary. Further suitable UV absorbers, light stabilizers and aging inhibitors are set out in EP 0 763 584.

An improvement in the light stability of backing film and adhesive is also possible by other additions to the protective film, particularly to the base layer of the backing film. This may be done by means of UV absorbers (for example Tinuvin P, Ciba) or, primarily, by means of reflecting pigments (for example titanium dioxide).

It may be appropriate to preformulate batches of film additives such as titanium dioxide, light stabilizers, aging inhibitors or procesasing aids, individually or together, preferably in polyethylene, polypropylene or polypropylene block copolymer.

The subject matter of the invention is especially suitable for application on painted vehicles such as automobiles. In this context, a bond strength of at least 0.7 N/cm even in the freshly bonded state is desirable (AFERA method 4001, corresponding to DIN EN 1939), in order that the film is unable to become detached at bond edges as a result of the stresses (especially in the case of uneven bonding) or even to become detached entirely as a result of the slipstream during transit or driving of the automobile. Since the bond strength on paints depends on their respective paint formulation, the bond strength of the protective film may be characterized more effectively by means of the bond strength to steel (AFERA). In the freshly bonded state this strength should as far as possible be between 0.5 and 3.8 N/cm, preferably between 0.7 and 1.7 N/cm.

The advantages of the unoriented polypropylene block copolymer for an automotive protective film have already been set out. Virtually all attempts to produce adhesive, adhesion promoter and film (comprising the block copolymer) by coextrusion in a single step have failed to date, since at a width of more than 1 m it was impossible to achieve uniform layer thickness distribution. The repetition of examples known from the literature for preparing protective films of the general kind by coextrusion shows that it was not possible to achieve application-compatible layer thickness distribution if the width of the unit is more than 1 m. This applies in particular when using raw materials for strongly adhering adhesives, i.e., not only slightly tacky, partially crystalline copolymers such as are commonly used for sealing layers. It was therefore very surprising that ethylene-vinyl acetate copolymers containing at least 40% (w/w) vinyl acetate with block copolymers could be coextruded as described in the example. The layer thickness distribution is so good that, with a running length of 1000 m and a width of 1.5 m, uniformly wound rolls were formed and the bond strength to steel (AFERA 4001) across the width lies within a tolerance range of ±20%. In order to achieve this result, it is necessary to harmonize the melt indices of the raw materials of the layers and the temperatures of the melt flows.

The most advantageous ranges are the following:

The melt indices of the film (including component layers such as primers) are from 1 to 10 g/10 min at 230° C. and 2.16 kg and, for the adhesive, from 0.5 to 10 g/10 min at 190° C. and 2.16 kg. The temperature of the adhesive melt lies below that of the film (measured at the point where the melt flows unite).

Surprisingly and unforeseeably for the person skilled in the art, a protective film having a backing layer of undrawn film based on at least one polypropylene block copolymer and, where appropriate, light stabilizer in an amount of at least 0.15% (w/w), with a polypropylene block copolymer content of from 10 to 95% (w/w) in the protective film at a preferred UV transmittance in the range from 290 to 360 nm of below 1% and a bond strength to steel of between 0.2 and 3.8 N/cm, especially when using ethylene-vinyl acetate copolymer containing at least 40% (w/w) vinyl acetate, exhibits the desired combination of properties:

low shrinkage (high heat stability)
good UV resistance
high toughness (protection against mechanical attack)
good stretchability
sufficient bond strength on application to curved surfaces
no residues when the protective film is removed The EVAc self-adhesive compositions used possess, on the one hand, good adhesion to a variety of finishes common in the automotive industry, which is retained under the effect of moisture or humid conditions, so that the protective film does not detach from the vehicle even under wind exposure or under tension caused by bonding to curved surfaces. Moreover, the self-adhesive composition possesses a sufficient bond strength within the first few minutes after application, so that after just half an hour, for example, the protective film may be subjected to severe slipstream load (up to 160 km/h), but on the other hand may also be removed without tearing following prolonged use. Furthermore, even without application of a release layer, the protective film of the invention has an unwind force which is sufficiently low for the user, despite the strongly adhering adhesive.

The peel force (bond strength) of the protective film of the invention from (to) 2K PU paints is generally more then 0.7 in the fresh state and less than 4 N/cm following storage under alternating climatic conditions (in analogy to AFERA method 4001). Even exposure of the protective film to UV light, using for example a Xenotest 1200 at 55° C. for 3000 hours, does not cause any deficiencies in the properties of the protective film: there is no embrittlement of the film and there are no residues of composition on removal.

The protective film of the invention is therefore particularly suitable for protecting the fresh finish of automobiles during assembly or transit or as processing and transit protection for freshly painted steel panels. The protective film can be bonded just half an hour after the painted surfaces have passed through the oven, without any disadvantages whatsoever, despite the fact that at this point in time the finish has not yet fully cured. The protective film also exhibits outstanding properties when used as an edge securing tape for the additional fastening of other kinds of extensive self-adhesive cover films with low bond strength.

A further feature of the protective film of the invention is that it can be applied in a large width over the hood, roof and trunk of automobiles and that, owing to its deformability, it conforms very well to planar and even gently curved shaped areas. It is therefore possible to protect the horizontal areas which are most at risk from soiling. However, event narrow areas such as, for example, the protection of the door below the windows, or bumpers, can easily be covered. Protection of the vertical areas on the vehicle is particularly appropriate during its assembly. Despite the good stretchability, the defect of shrinkage of conventional readily deformable polyethylene protective films is not in evidence.

The protective film is resistant to sunlight, moisture, heat and cold, with weathering stability of at least one year. In particular, the addition of pigments such as titanium dioxide and of light stabilizers leads to an improvement in the UV stability of the protective film. Even very high sun levels, such as are encountered in Florida, for example, do not cause the protective film to fail or detach. The extremely low UV transmittance of the protective film prevents the adhesive being broken by sun exposure.

Furthermore, the strength of the protective film in comparison to preservation with wax ensures impeccable protection against soiling such as bird droppings and against damage to the vehicle as a whole by minor mechanical events. Despite the requisite effect of adhesion, the protective film can be removed after use without residue and without tearing of the backing film. It is possible to recycle the protective film or recover energy from it, in particular since it is halogen-free.

In the text below, the invention will be illustrated on the basis of examples which are not, however, intended to restrict the invention.

EXAMPLES

Example 1

A film was manufactured by flat film extrusion in a width of 1450 mm. It was composed of a 50 µm base layer and a 10 µm adhesion promoter layer. The base layer consisted of 91.3% (w/w) Novolen 2309 L block copolymer (BASF, melt index 6 g/10 min at 230° C. and 2.16 kg, ethylene content approx. 6.5% (w/w)), 8.4% (w/w) titanium dioxide and 0.3% (w/w) Tinuvin 770 HALS stabilizer. The adhesion promoter layer was composed of 50% (w/w) Novolen 2309 L and 50% (w/w) Escorene Ultra UL 00728 EVAc copolymer (Exxon). Prior to extrusion, the raw materials were premixed using a concrete mixer.

The film had the following physical properties:

| | | |
|---|---|---|
| Overall thickness of film with adhesion promoter | 60 µm | DIN 53370 |
| Overall weight of film with adhesion promoter | 59 g/m² | DIN 53365 |
| Tensile strength, MD | 45 N/mm² | DIN 53455-7-5 |
| Force at 10% elongation, MD | 14.5 N/cm | DIN 53455-7-5 |
| Tensile strength, CD | 42 N/mm² | DIN 53455-7-5 |
| Elongation, MD | 820% | DIN 53455-7-5 |
| Elongation, CD | 840% | DIN 53455-7-5 |
| Shrinkage, MD | 0.9% | 10 min 120° C. |
| Shirnkage, CD | 0% | 10 min 120° C. |
| Tensile impact strength, MD | >3000 mJ/mm² | DIN 53448 |
| Tensile impact strength, CD | 2500 mJ/mm² | DIN 53448 |
| UV transmittance | 0.2% | spectrophotometer |

The adhesive used was a 10% strength solution of the following raw materials in toluene:

65% (w/w) of a copolymer of 70% (w/w) vinyl acetate and 30% (w/w) ethylene having a Mooney viscosity ML (1+4) at 100° C. (DIN 53523) without pretreatment of 28.

30% (w/w) of a copolymer of 45% (w/w) vinyl acetate and 55% (w/w) ethylene having a Mooney viscosity ML (1+4) at 100° C. (DIN 53523) without pretreatment of 18.

4.8% (w/w) of a hydrogenated rosin glycerol ester.

0.2% (w/w) of Irganox 1010 (antioxidant).

The adhesive solution was applied to the film using a coating bar and dried in a tunnel at 80° C. for four minutes. The resulting protective film was edged and wound into rolls 200 m long and 1,400 mm wide. The application of adhesive amounted to 20 μm.

The self-adhesive film produced in this way was readily unwindable, without creases, and could be applied flawlessly when used to protect automobiles. The protective film was characterized by the physical properties shown in the following table.

| | |
|---|---|
| Overall thickness of protective film | 80 μm |
| Bond strength to 2K PU paint after 3 days at 90° C. with a peel angle of 180° and a peel rate of 300 mm/min | 3.6 N/cm |
| Bond strength to the reverse, at a peel angle of 180° and a peel rate of 300 mm/min | 0.7 N/cm |
| Bond strength to steel | 1.0 N/cm |
| Bond strength to paint | 0.9 N/cm |

The protective film was bonded to metal panels which had been freshly painted (with 2K PU paint) and was removed by peeling after temperature storage (3 days at 90° C.). In the edge region only slight paint deformations were evident, while under oblique light a slight loss of brightness was observable over the area. No shrinkage was evident at the bond edges. Samples bonded to painted metal were subjected to UV aging (1750 h of Xenotest 150, corresponding to 97 kLy); following removal there were neither residues of adhesive composition nor tears, and no shrinkage was evident at the bond edges. A curved auto hood with strongly pronounced beads was covered with the adhesive protective film, with the aid of a felt doctor. There were no creases or holes owing to inadequate stretchability or detachment at the bond edges.

Example 2

Production was carried out as in example 1 but the adhesive used was a mixture of polyisobutylenes of which 35% (w/w) had a molecular weight Mw of $1.2.10^6$ g/mol and 65% (w/w) an Mw of 35,000 g/mol. The bond strength to paint (fresh) was 0.4 N/cm or 1.7 N/cm (after 3 days of storage at 90° C.) and to steel it was 0.5 N/cm. The protective film was bonded to metal panels which had been freshly painted (with 2K PU paint) and was removed by peeling after temperature storage (3 days at 90° C.). In the edge region only slight paint deformations were evident, while under oblique light a slight loss of brightness was observable over the area. No shrinkage was evident at the bond edges, Samples bonded to painted metal were subjected to UV aging (1750 h of Xenotest 150, corresponding to 97 kLy); following removal there were neither residues of adhesive composition (with the exception of a narrow, 0.1 mm strip at the bond edges) nor tears, and no shrinkage was evident at the bond edges. A curved auto hood with strongly pronounced beads was covered with the adhesive protective film, with the aid of a felt doctor. There were no creases or holes owing to inadequate stretchability. The same protective film was bonded to a 1 K PU paint on metal sample panels and on a vehicle. The bond strength to paint was 0.2 N/cm (in the fresh state) or 1.4 N/cm (after 3 days of storage at 90° C.). At the edges of areas on which the film was stretched to a relatively high degree, the protective film lifted off to such an extent that it had to be reinforced using an edge securing tape.

Example 3

The protective film was produced by coextrusion of three layers including adhesive. Raw materials:

main layer 50 μm: 60% (w/w) Daplen FFC 2012 block copolymer (PCD, melt index 5 g/10 min at 230° C. and 2.16 kg, ethylene content approx. 12% (w/w)), 25% (w/w) Daplen KF 201 homopolymer (PCD, melt index 8 g/10 min at 230° C. and 2.16 kg), 6.3% (w/w) Lupofen 1840 H (LDPE, Elenac GmbH, melt index 1.5 9/10 min at 190° C. and 2.16 kg, density 0.919 g/cm³), 8.4% (w/w) titanium dioxide and 0.3% (w/w) Tinuvin 770.

adhesion promoter layer 10 μm: as example 1 adhesive layer 25 μm: copolymer of 60% (w/w) vinyl acetate and 40% (w/w) ethylene with a melt index of 3 g/10 min at 190° C. and 2.16 kg. Prior to extrusion, the adhesive base material was processed into granules approximately 5 mm in size, with the addition of about 1% (w/w) of silica as powdering agent.

The physical properties of the film were as follows:

| | | |
|---|---|---|
| Overall thickness of the protective film | 85 μm | DIN 53370 |
| Overall weight of the protective film | 83 g/m² | DIN 53365 |
| Tensile strength, MD | 43 N/mm² | DIN 53455-7-5 |
| Force at 10% elongation, MD | 12 N/cm | DIN 53455-7-5 |
| Tensile strength, CD | 37 N/mm² | DIN 53455-7-5 |
| Elongation, MD | 790% | DIN 53455-7-5 |
| Elongation, CD | 860% | DIN 53455-7-5 |
| Shrinkage, MD | 0.5% | 10 min 120° C. |
| Shrinkage, CD | 0.1% | 10 min 120° C. |
| Tensile impact strength, MD | >3000 mJ/mm² | DIN 53448 |
| Tensile impact strength, CD | 2800 mJ/mm² | DIN 53448 |
| UV transmittance | 0.2% | spectrophotometer |

*calculated assuming a thickness of 60 μm (excluding adhesive layer).

The roll of protective film produced in this way was 1.5 m wide and 1 000 m long, with impeccable quality of winding. The roll could be unwound easily and without creases and could be applied flawlessly when used to protect automobiles. Following use, this self-adhesive film could be removed again by peeling without deficiencies after a bonding period of up to one year under outdoor weathering. The protective film was characterized by the physical properties shown in the following table.

| | |
|---|---|
| Bond strength to 2K PU paint after 3 days at 90° C., with a peel angle of 180° and a peel rate of 300 mm/min | 2.7 N/cm |
| Bond strength to the reverse, at a peel angle of 180° and a peel rate of 300 mm/min | 0.4 N/cm |
| Bond strength to steel | 1.1 N/cm |
| Bond strength to paint | 1.0 N/cm |

The protective film was bonded to metal panels which had been freshly painted (with 2K PU paint) and was removed by peeling after temperature storage (3 days at 90° C.). In the edge region no paint deformation was evident. No shrinkage was evident at the bond edges. Samples bonded to painted metal were subjected to UV aging (1750 h of Xenotest 150, corresponding to 97 kLy); following removal there were neither residues of adhesive composition nor tears, and no shrinkage was evident at the bond edges. A curved auto hood with strongly pronounced beads was covered with the adhesive protective film, with the aid of a felt doctor. There were no creases or holes owing to inadequate stretchability or detachment at the bond edges.

COMPARATIVE EXAMPLES

Comparative Example 1

Production was carried out as in example 1. However, the film used was a monoaxially oriented film of Borealis P410F (melt index 0.9 g/10 min at 230° C. and 2.16 kg, ethylene content approx. 9%). The film was produced as in comparative example A of DE 36 40 861 A1.

The film had the following physical properties:

| | | |
|---|---|---|
| Overall thickness of film with adhesion promoter | 63 μm | DIN 53370 |
| Overall weight of film with adhesion promoter | 60 g/m² | DIN 53365 |
| Tensile strength, MD | 350 N/mm² | DIN 53455-7-5 |
| Force at 10% elongation, MD | 150 N/15 mm | DIN 53455-7-5 |
| Elongation, MD | 38% | DIN 53455-7-5 |
| Shrinkage, MD | 8% | 10 min 120° C. |
| Tensile impact strength, MD | 1200 mJ/mm² | DIN 53448 |
| Tensile impact strength, CD | 250 mJ/mm² | DIN 53448 |
| UV transmittance | 95% | spectrophotometer |

The roll could not be unwound because the film underwent splitting (tearing in the 3rd dimension). For bonding tests, therefore, samples were used which had been covered with silicone paper after coating. The protective film was characterized by the physical properties shown in the following table.

| | |
|---|---|
| Overall thickness of protective film: | 83 μm |
| Bond strength to 2K PU paint after 3 days at 90° C. with a peel angle of 180° and a peel rate of 300 mm/min | film undergoes splitting |
| Bond strength to the reverse, at a peel angle of 180° and a peel rate of 300 mm/min | 1.2 N/cm |
| Bond strength to steel | 1.1 N/cm |
| Bond strength to paint | 1.0 N/cm |

The protective film was bonded to metal panels which had been freshly painted (with 2K PU paint). After 3 days at 90° C. it was removable only with splitting and tearing (in the longitudinal direction). No shrinkage was evident at the bond edges longitudinally, while in the cross-direction the shrinkage was 5%. Samples bonded to painted metal were subjected to UV aging (1750 h of Xenotest 150, corresponding to 97 kLy); the protective film had broken down into crumbs. At the original bond edges crosswise, severe shrinkage was still in evidence. A curved auto hood with strongly pronounced beads was covered with the adhesive protective film, with the aid of a felt doctor. There were severe creases and tears in the longitudinal direction owing to inadequate stretchability.

Comparative Example 2

Production was as in example 1 but for the film a PP random copolymer Novolen 3300 MC (Targor GmbH) was used: melt index 8.0 g910 min at 230° C. and 2.16 kg, ethylene content approx. 3.5% (w/w).

The physical properties of the film were as follows:

| | | |
|---|---|---|
| Overall thickness of film with adhesion promoter | 60 μm | DIN 53370 |
| Overall weight of film with adhesion promoter | 59 g/m² | DIN 53365 |
| Tensile strength, MD | 35 N/mm² | DIN 53455-7-5 |
| Force at 10% elongation, MD | 10 N/cm | DIN 53455-7-5 |
| Elongation, MD | 610% | DIN 53455-7-5 |
| Shrinkage, MD | 3.1% | 10 min 120° C. |
| Tensile impact strength, MD | 2100 mJ/mm² | DIN 53448 |
| Tensile impact strength, CD | 800 mJ/mm² | DIN 53448 |
| UV transmittance | 0.2% | spectrophotometer |

The self-adhesive film produced in this way was vaguely distorted at the points at which the film was held during unwinding. However, owing to the flexibility, it could be applied effectively to a vehicle.

The protective film was bonded to metal panels which had been freshly painted (with 2K PU paint) and was removed by peeling after 3 days at 90° C. At all bond edges there was distinct shrinkage in evidence (residues of adhesive in a width of several mm). Samples bonded to painted metal were subjected to UV aging (1750 h of Xenotest 150, corresponding to 97 kLy); following removal there were no residues of adhesive composition but there were several tears, and severe shrinkage occurred at two bond edges. A curved auto hood with strongly pronounced beads was covered with the adhesive protective film, with the aid of a felt doctor. There were no creases or holes owing to inadequate stretchability or detachment at the bond edges.

Comparative Example 3

Production was as in example 1 but for the film a PP homopolymer Novolen 1102 M (Targor GmbH) was used; melt index 8.0 g/10 min at 230° C. and 2.16 kg, ethylene content zero. In addition, light stabilizers and titanium dioxide were omitted.

The physical properties of the film were as follows:

| | | |
|---|---|---|
| Overall thickness to film with adhesion promoter | 60 μm | DIN 53370 |
| Overall weight of film with adhesion promoter | 55 g/m² | DIN 53365 |
| Tensile strength, MD | 50 N/mm² | DIN 53455-7-5 |
| Force at 10% elongation, MD | 17 N/cm | DIN 53455-7-5 |
| Elongation, MD | 640% | DIN 53455-7-5 |
| Shrinkage, MD | 0.5% | 10 min 120° C. |
| Tensile impact strength, MD | 2500 mJ/mm² | DIN 53448 |
| Tensile impact strength, CD | 200 mJ/mm² | DIN 53448 |
| UV transmittance | 94% | spectrophotometer |

The protective film was bonded to metal panels which had been freshly painted (with 2K PU paint) and was removed by peeling after 3 days at 90° C. Shrinkage or tears were not observed. Samples bonded to painted metal were subjected to UV aging (1750 h of Xenotest 150, corresponding to 97 kLy). The film had broken down completely; however, it was still possible to recognize that no shrinkage had occurred. A curved auto hood with strongly pronounced beads was covered with the adhesive protective film, with the aid of a felt doctor. There were a few creases but no detachment at the bond edges.

Comparative Example 4

Production was carried out as in example 1, for the film, however, a mixture of 37% (w/w) Novolen 1102 M PP homopolymer (Targor GmbH, melt index 8.0 g/10 min at 230° C. and 2.16 kg), 54.3% (w/w) Lupolen 1840 H LDPE (Elenac GmbH, melt index 1.5 g/10 min at 190° C. and 2.16 kg), and 8.4% (w/w) titanium dioxide and 0.3% (w/w) Tinuvin 770 HALS stabilizer was used.

The film had the following physical properties:

| | | |
|---|---|---|
| Overall thickness of film with adhesion promoter | 68 μm | DIN 53370 |
| Overall weight of film with adhesion promoter | 63 g/m$^2$ | DIN 53365 |
| Tensile strength, MD | 30 N/mm$^2$ | DIN 53455-7-5 |
| Force at 10% elongation, MD | 13 N/cm | DIN 53455-7-5 |
| Elongation, MD | 720% | DIN 53455-7-5 |
| Shrinkage MD | 2.5% | 10 min 120 ° C. |
| Tensile impact strength, MD | 3200 mJ/mm$^2$ | DIN 53448 |
| Tensile impact strength, CD | 300 mJ/mm$^2$ | DIN 53448 |
| UV transmittance | 0.2% | spectrophotometer |

The protective film was characterized by the physical properties shown in the following table.

| | |
|---|---|
| Overall thickness of protective film: | 81 μm |
| Bond strength to 2K PU paint after 3 days at 90° C. with a peel angle of 180° and a peel rate of 300 mm/min | 3.6 N/cm |
| Bond strength to the reverse, at a peel angle of 180° and a peel rate of 300 mm/min | 0.7 N/cm |
| Bond strength to steel | 1.1 N/cm |
| Bond strength to paint | 1.0 N/cm |

The protective film was bonded to metal panels which had been freshly painted (with 2K PU paint) and removed by peeling after 3 days at 90° C. Slight shrinkage and also residues of adhesive were evident at the bond edges. Slight paint deformation occurred at the edges, with creases. Samples bonded to painted metal were subjected to UV aging (1750 h of Xenotest 150, corresponding to 97 kLy). Following removal, there were no residues of adhesive composition remaining. A curved auto hood with strongly pronounced beads was covered with the adhesive protective film, with the aid of a felt doctor. A high level of creasing occurred. On demasking after 48 hours, the film tore in some cases in strips parallel to the longitudinal direction.

What is claimed is:

1. A self-adhesive protective film having a backing layer and an adhesive layer, wherein
   the backing layer is an undrawn film,
   the backing layer comprises at least one polypropylene block copolymer in an amount of from 10 to 95% by weight of the protective film,
   said polypropylene block copolymer comprises ethylene and the ethylene content of the block copolymer is between 3 and 15% (w/w).

2. The self-adhesive protective film according to claim 1, wherein the bond strength to steel is between 0.2 and 3.8 N/cm.

3. The self-adhesive protective film according to claim 1, wherein the tensile impact strength is at least 1 000 mJ/mm$^2$ in both machine and cross directions.

4. The self-adhesive protective film according to claim 1, wherein the shrinkage is less than 3% in both machine and cross directions.

5. The self-adhesive protective film according to claim 1, wherein the UV transmittance in the range from 290 to 360 nm is below 1%.

6. The self-adhesive protective film according to claim 1, wherein the force at 10% elongation does not exceed 24 N/15 mm in either the machine or cross directions.

7. The self-adhesive protective film according to claim 1, wherein the thickness of the backing layer is between 20 and 80 μm.

8. The self-adhesive protective film according to claim 1, wherein the fraction of propylene in one film is at least 65% (w/w).

9. The self-adhesive protective film according to claim 1, wherein the melt index of the polypropylene block copolymer is between 0.8 and 15 g/10 min at 230° C. and 2.16 kg.

10. The self-adhesive protective film according to claim 1, wherein the backing layer comprises at least one light stabilizer in an amount of at least 0.15% (w/w).

11. The self-adhesive protective film according to claim 1, wherein the adhesive layer comprises at least one copolymer of ethylene and vinyl acetate, with the vinyl acetate content of the adhesive layer being at least 40% (w/w).

12. The self-adhesive protective film according to claim 1, which comprises an adhesion promoter layer between the backing layer and the adhesive composition.

13. The self-adhesive protective film according to claim 12, wherein the backing layer is coextruded together with the adhesion promoter layer.

14. The self-adhesive protective film according to claim 1, wherein said self-adhesive protective film is produced by simultaneous coextrusion of the adhesive composition and of the backing film.

15. A method for protecting painted areas of vehicles or vehicle parts which comprises applying the self-adhesive protective film of claim 1 to said painted areas of said vehicles or vehicle parts.

16. The self-adhesive protective film of claim 2, wherein said bond strength is between 0.7 and 1.7 N/cm.

17. The self-adhesive protective film of claim 4, wherein said shrinkage is less than 1%.

18. The self-adhesive protective film of claim 6, wherein said force at 10% elongation does not exceed 16 N/15 mm in either the machine or cross directions.

19. The self-adhesive protective film of claim 11, wherein said vinyl acetate content is from 55 to 70% by weight.

20. The self-adhesive protective film of claim 12, wherein the thickness of the backing film and adhesion promoter layer is between 20 and 80 μm.

* * * * *

UNITED STATES PATENT AND TRADEMARK OFFICE
CERTIFICATE OF CORRECTION

PATENT NO. : 6,803,101 B1
DATED : October 12, 2004
INVENTOR(S) : Bohm et al.

It is certified that error appears in the above-identified patent and that said Letters Patent is hereby corrected as shown below:

<u>Column 2,</u>
Line 41, "With (his" should read -- With this --
Line 44, "use, Owing" should read -- use. Owing --
Line 62, "protected, During" should read -- protected. During --

<u>Column 4,</u>
Lines 17-18, "in accordance With" should read -- in accordance with --

<u>Column 5,</u>
Line 62, "moderate, The use" should read -- moderate. The use --

<u>Column 6,</u>
Line 33, "suitable The" should read -- suitable. The --

<u>Column 7,</u>
Line 57, "o-olefin" should read -- α-olefin --

<u>Column 8,</u>
Line 18, "tetramethyl4-piperidinyl" should read -- tetramethyl-4-piperidinyl --

<u>Column 12,</u>
Line 12, "Lupofen" should read -- Lupolen --
Line 13, "9/10 min" should read -- g/10 min --

<u>Column 13,</u>
Line 66, "8.0 g910 min" should read -- 8.0g/10 min --

UNITED STATES PATENT AND TRADEMARK OFFICE
CERTIFICATE OF CORRECTION

PATENT NO. : 6,803,101 B1
DATED : October 12, 2004
INVENTOR(S) : Bohm et al.

It is certified that error appears in the above-identified patent and that said Letters Patent is hereby corrected as shown below:

<u>Column 14,</u>
Line 53, "2500 mJ/mm$^2$" should read -- 2800 mJ/ mm$^2$ --

Signed and Sealed this

Eighth Day of March, 2005

JON W. DUDAS
*Director of the United States Patent and Trademark Office*